(12) United States Patent
Zalmanson et al.

(10) Patent No.: US 9,679,382 B2
(45) Date of Patent: Jun. 13, 2017

(54) GEOREFERENCING METHOD AND SYSTEM

(71) Applicant: ISRAEL AEROSPACE INDUSTRIES LTD., Lod (IL)

(72) Inventors: Garry Haim Zalmanson, Raanana (IL); Gil Bar Hillel, Tel Aviv (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 1 day.

(21) Appl. No.: 14/905,319

(22) PCT Filed: Jun. 25, 2014

(86) PCT No.: PCT/IL2014/050570
§ 371 (c)(1),
(2) Date: Jan. 15, 2016

(87) PCT Pub. No.: WO2015/011696
PCT Pub. Date: Jan. 29, 2015

(65) Prior Publication Data
US 2016/0180535 A1 Jun. 23, 2016

(30) Foreign Application Priority Data
Jul. 24, 2013 (IL) .......................................... 227627

(51) Int. Cl.
*G06K 9/00* (2006.01)
*G06T 7/00* (2017.01)
(Continued)

(52) U.S. Cl.
CPC ............ *G06T 7/0044* (2013.01); *G01C 11/06* (2013.01); *G06T 7/337* (2017.01); *G06T 7/74* (2017.01); *G06T 2207/10028* (2013.01)

(58) Field of Classification Search
CPC .............. G06T 7/00; G01C 11/00; G06K 9/00
(Continued)

(56) References Cited

U.S. PATENT DOCUMENTS 8,411,961 B1 * 4/2013 Jin ........................ G06K 9/6211
348/36
2001/0038718 A1 11/2001 Kumar et al.
(Continued)

FOREIGN PATENT DOCUMENTS

EP 1418401 A1 5/2004
WO 03/101110 A1 12/2003
(Continued)

OTHER PUBLICATIONS

Criss et al., "Multiple Image Coordinate Extraction (MICE) Technique for Rapid Targeting of Precision Guided Munitions", Johns Hopkins APL Technical digest, vol. 19, No. 4, 1998.

*Primary Examiner* — Abolfazl Tabatabai
(74) *Attorney, Agent, or Firm* — Oliff PLC

(57) ABSTRACT

A method of georeferencing a first image of a scene acquired from a first imaging device based on at least one second image of the scene acquired from a second imaging device. The method includes obtaining data indicative of an eligibility parameter for one or more areas of the scene; selecting one or more pivot areas among the one or more areas of the scene, wherein the eligibility parameter of the pivot areas satisfy a predefined criterion; for at least some of the selected pivot areas, identifying tie points for the first and second images; and solving the external orientation of the first image using the identified tie points and a first imaging device model.

20 Claims, 8 Drawing Sheets

(51) Int. Cl.
*G01C 11/06* (2006.01)
*G06T 7/33* (2017.01)
*G06T 7/73* (2017.01)
*H04N 5/225* (2006.01)

(58) Field of Classification Search
USPC ........ 382/103, 236; 348/169, 170, 171, 172, 348/352
See application file for complete search history.

(56) References Cited

U.S. PATENT DOCUMENTS

| 2003/0011591 | A1 | 1/2003 | Takada et al. |
| 2012/0063668 | A1 | 3/2012 | Zalmanson |
| 2013/0028516 | A1 | 1/2013 | Warfield et al. |

FOREIGN PATENT DOCUMENTS

| WO | 2011/067713 | A2 | 6/2011 |
| WO | 2011/093751 | A1 | 8/2011 |

\* cited by examiner

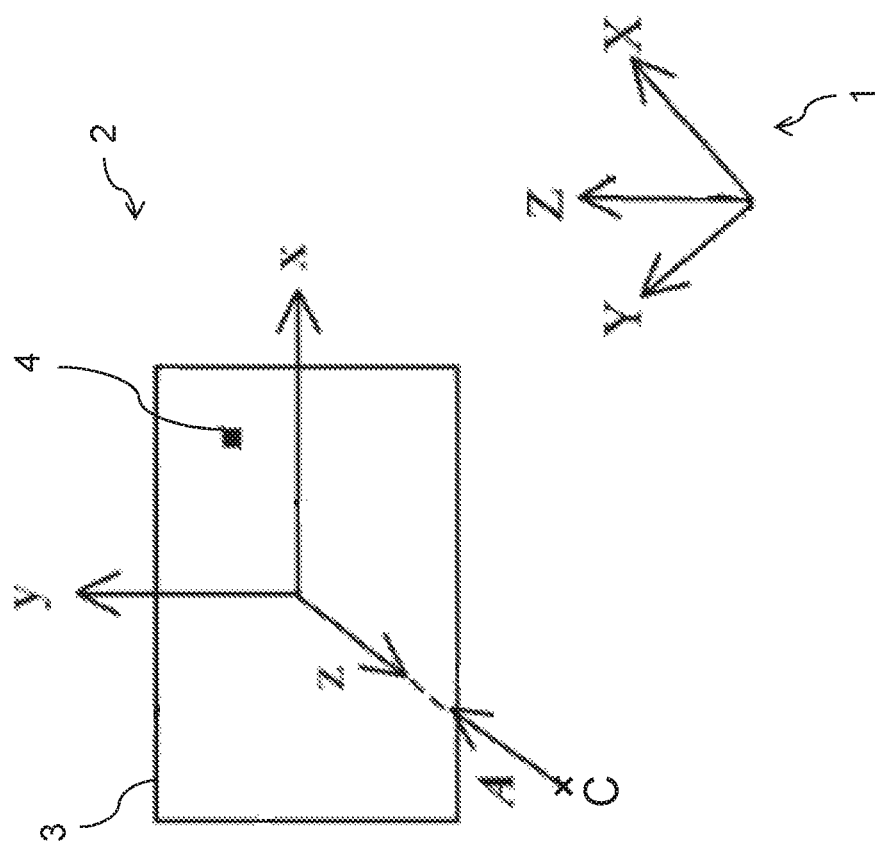

GEOREFERENCING METHOD AND SYSTEM

TECHNOLOGICAL FIELD

The present disclosure relates generally to photogrammetry. More particularly, the present disclosure relates to use of photogrammetry for georeferencing of an image and for target location.

BACKGROUND

Photogrammetry refers to methods for determining geometrical properties of an object from one or more images of the object acquired by one or more imaging devices. Photogrammetry can be applied to determine location of an object. For example, the technique "*Multiple Image Coordinate Extraction (MICE) Technique for Rapid Targeting of Precision Guided Munitions*", Thomas B. Criss et al., *Johns Hopkins APL Technical digest*, volume 19, number 4 (1998) discloses a method to locate an object by acquiring at least three images of the object from non collinear positions with at least three common points among the images. However, the method requires manual identification of the common points which can be for example a tuft of vegetation, a rock, a corner of a building, etc.

Some other current techniques avoid using manual identification of common points by using image matching process as described in European patent applications EP-A2-2507768 and EP-A1-1512289. However, when determining location of an object using a plurality of images with strongly non-collinear lines of sight (i.e. highly oblique images), such techniques do not provide satisfying results because the image matching process fails to detect relevant common points.

GENERAL DESCRIPTION

The present disclosure provides a method of georeferencing an image avoiding manual identification of common points and capable of addressing cases in which the lines of sight of an image under analysis and a reference image have weak collinearity (i.e. highly oblique). For example, the present disclosure may advantageously be applied to georeference a ground image—for example acquired by an imaging device positioned on the ground or on the sea—from a reference image acquired for example by an imaging device positioned in a plane or in a satellite. The reference image may be preliminarily georeferenced.

In the present application, the following terms and their derivatives may be understood in light of the below explanations:

Imaging Device

An imaging device is an apparatus capable of acquiring pictures of a scene. In the following it is also generally referred to as a camera and it should be understood that the term camera encompasses different types of imaging device such as standard digital camera, thermal camera, etc. Further, it is noted that in the present disclosure it is made reference to a "ground" imaging device, a "ground" image, a "reference" imaging device and a "reference" image for illustrative purpose only and that these terms in fact define generally a first and second imaging devices and images without further limitations.

Line of Sight (LOS)

The term "line of sight" is used to refer to an orientation of a vector supporting an optical axis of a camera acquiring an image. It can be associated to an acquired image and understood as a vector supporting a line from the optical center of the camera to an object in the physical world appearing at a center of the image. This notion is also referred to as central line of sight in the following. Further, it is noted that relative angles between a couple of objects appearing in an image can be determined based on the position of said objects' conjugates in the image and on the characteristics of the camera. Therefore, determining the central line of sight enables to derive orientation of any line linking the optical center of the camera to an object in the physical world, provided that the object appears in the image. By extension, the term "line of sight of a point (or pixel) in an image" is used to refer to an orientation of a vector supporting a line linking the optical center of the camera to an object conjugated at said point (pixel) in the image. Likewise, this extended notion is also referred to as "local line of sight" at the position of the object in the following.

Coordinate Systems

With reference to FIG. 1, a ground referential 1 is a reference coordinate system (X, Y, Z) adapted for locating objects in the physical space. For example, the ground referential may be WGS84. The image referential 2 is a coordinate system (x, y, z) related to the image plane 3 of the camera in which x and y may be defined within the image plane and z may be defined to form a right-handed image coordinate system. The image coordinate system (x, y, z) may be centered on the image so that the z-axis is superimposed with an optical axis of the camera (i.e. a line of sight of an acquired image). Additionally, a point C may represent a position of the camera and a vector A originating from C may represent a line of sight of the camera. An image point 4 in the image plane (x, y) may be identified by pixel index (c, r) since the camera may comprise, in some embodiments, a pixel matrix sensor in the image plane.

Georeferencing

Georeferencing refers to the process of characterizing with a predetermined level of accuracy external parameters of an image.

The external parameters of an image (also referred to as external orientation) refer to a position and orientation of an image in space i.e. a position and a line of sight of the camera which acquired the image. The external parameters are usually referred to as "6dof" of an image (i.e. 6 degrees of freedom) since these parameters comprise three rotation angles (Euler angles) that describe the rotations about three principal axes needed to rotate from the ground referential 1 into the image referential 2 and three coordinates of the camera in the ground referential 1.

Internal parameters refer to intrinsic properties of the camera. Internal parameters may comprise the camera's focal length, aberrations, etc.

Camera Model

A camera model refers to a mathematical simulation (i.e. a model) which models a transformation from an object domain to an image domain using the internal parameters and external parameters. The camera model is usually represented by collinearity equations.

Two image points from two images are said to be homologous when these points arise from the same scene point in the physical space.

Tie Point

A scene point in the physical space is defined as a tie point if this scene point can be identified in a reference georeferenced image and in an image ongoing the georeferencing process.

Control Point

A scene point in the physical space is defined as a control point if this scene point has known coordinates in the ground referential and can be identified in a reference georeferenced image and in an image ongoing the georeferencing process.

DEM

A digital elevation model (DEM) may be defined as a digital representation of the elevation of locations on the land surface of the earth.

Solving

The term solving may refer to the step of improving accuracy of the external and/or internal parameters of a camera model related to an analyzed image by an iterative process (for example trial/error process) i.e. finding an optimal solution of the internal and/or external parameters which best fits input data. For example input data can be provided in the form of control points whose ground coordinates are known and whose image coordinates are detected in the analyzed image.

Geo-Location

Geo-location refers to determining the position of an object in a ground coordinate system, for example WGS84. Generally, geo-location may be performed using the camera location and line of sight and any of the following alternative features:

(i) a laser range finder to determine the distance from the ground camera to the target;
(ii) the digital elevation model;
(iii) a ray intersection process between the ground image and the reference image by finding the target in the reference image manually;
(iv) a ray intersection process between the panorama and the reference image by finding the target in the reference image automatically.

The present disclosure provides a method of georeferencing a first image of a scene acquired from a first imaging device based on at least one second image of the scene acquired from a second imaging device. The method comprises obtaining data indicative of an eligibility parameter for one or more areas of the scene; selecting one or more pivot areas among the one or more areas of the scene, wherein the eligibility parameter of the pivot areas satisfy a predefined criterion; for at least some of the selected pivot areas, identifying tie points for the first and second images; and solving the external orientation of the first image using the identified tie points and a first imaging device model.

In some embodiments, obtaining data indicative of an eligibility parameter of a given area is performed using an external orientation of the first image and an external orientation of the second image at the given area.

In some embodiments, the eligibility parameter associated to a given area enables to assess a quality of a synthetic view that would result from synthesizing a zone of the second image with the external orientation of the first image wherein the zone of the second image corresponds to the given area of the scene.

In some embodiments, an external orientation of the first image is approximately predetermined and an external orientation of the second image is accurately predetermined.

In some embodiments, the eligibility parameter for a given area of the scene is defined as an angle between the local line of sight of the second image and the local line of sight of the first image at said given area.

In some embodiments, the eligibility parameter satisfies the predefined criteria when the angle is below a predetermined threshold.

In some embodiments, each pivot area of the scene correspond to a first pivot zone in the first image and to a second pivot zone in the second image and wherein identifying tie points comprises detecting first and second tie pixels by image matching process between the first and second pivot zones.

In some embodiments, detecting first and second tie pixels comprises determining a transformation between the first and second pivot zones and applying said transformation to a set of pixels of the first pivot zone.

In some embodiments, determining a transformation between the first and second pivot zones comprises determining a view transformation for synthesizing a view of the second pivot zone with the approximate external orientation of the first image and a residual transformation for passing from the synthesized view to the first pivot zone.

In some embodiments, the residual transformation is determined using an optimization algorithm.

In some embodiments, one or more subsequent second images of the scene with predetermined accurate external orientations are provided and solving the external orientation comprises calculating coordinates of the tie points in a ground referential by ray tracing using the one or more subsequent second images.

In some embodiments, one or more subsequent second images of the scene with predetermined accurate external orientations are provided and selecting one or more pivot area is performed with said subsequent second images and each pivot area is associated with a second image.

In some embodiments, the method further comprises solving an internal orientation of the first image.

In some embodiments, the method further comprises capturing a plurality of overlapping images using the first imaging device and creating a panorama thereby providing the first image.

In some embodiments, the method further comprises relative referencing of the plurality of overlapping images.

In some embodiments, the second imaging device and the first imaging device are identical.

The present disclosure also provides a method of geo-locating a target in a scene using a first image of the scene acquired from a first imaging device and at least one second image of the scene acquired from a second imaging device. The method comprises georeferencing the first image; identifying target pixel coordinates in the first image and in the second image; and determining the target ground coordinates using ray intersection, wherein the georeferencing is performed according to the method previously described.

In some embodiments, identifying the target pixel coordinates in the second image comprises identifying a first target zone in the first image; determining a corresponding second target zone in the second image; determining a transformation between the first and second target zones; and applying said transformation to the target pixels in the first image.

The present disclosure further provides a data processing apparatus comprising means for carrying out the methods described previously.

The present disclosure further provides a data processing apparatus for georeferencing a first image of a scene acquired from a first imaging device based on at least one second image of the scene acquired from a second imaging device. The data processing apparatus comprises an analysis and selection unit configured for: obtaining data indicative of an eligibility parameter for one or more areas of the scene; and selecting one or more pivot areas among the one or more areas of the scene, wherein the eligibility parameter of the pivot areas satisfy a predefined criteria; an identification unit configured for identifying, for at least some of the pivot areas, tie points between the first and second images; a calculation unit configured for solving the external orientation of the first image based on the identified tie points and on a first imaging device model.

The present disclosure also provides an imaging device including the data processing apparatus as previously described.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1, already described, illustrates a ground referential and an image referential in some embodiments of the present disclosure.

DETAILED DESCRIPTION OF EMBODIMENTS

Figure 2A:
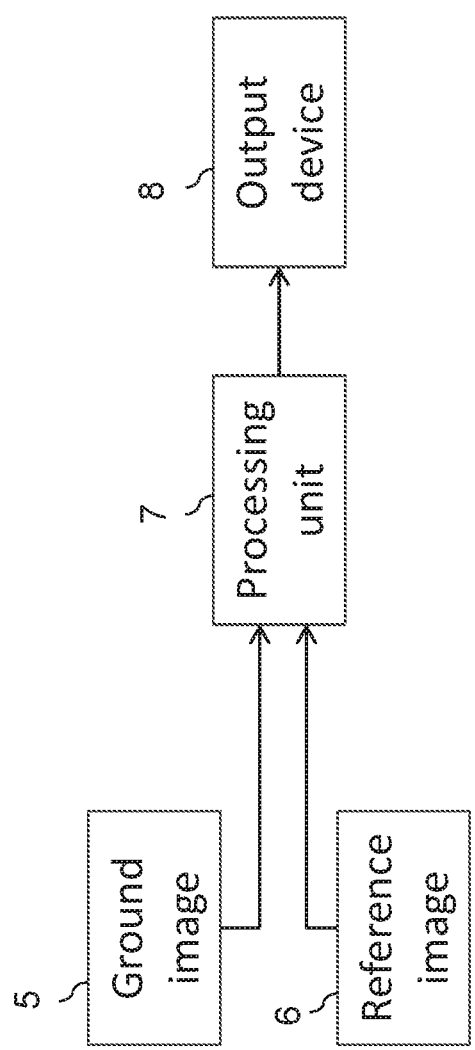
FIG. 2A illustrates schematically a functional block diagram of a system implementing a method according to embodiments of the present disclosure.

Described herein are some examples of systems and methods useful for georeferencing an image and for determining location of an object in said image.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "coding", "handling", "compressing", "spreading", "transmitting", "amplifying", "performing", "forming", "analyzing", "or the like, may refer to the action(s) and/or process (es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Generally, a method of georeferencing according to the present disclosure refers to georeferencing of a first image of a scene acquired by a first imaging device by using at least one second image of the scene (i.e. the second image having an overlap with the first image) acquired by a second imaging device. The first and second image a common scene from two a priori different locations and with two a priori different lines of sight. The second image is preliminarily georeferenced i.e. the external and internal parameters of the second image are known with a sufficient level of accuracy in view of the expected application (for example: target location). In the following the first image is referred to as ground image, the second (georeferenced) image is referred to as reference image and the first and second imaging device are referred to as first and second camera (or ground camera and reference camera).

The first and second camera may respectively be associated with a first and second camera models. Parameters of the first camera model may be preliminary known with an accuracy to be improved. Parameters of the second camera model may be preliminary known with an accuracy deemed sufficient for the contemplated application. In the following, details are provided for a given model of the first and second cameras. It is understood that the present disclosure can be extended to any type of camera model.

The considered camera model provides a relation between object and image domains as follows:

$$\begin{bmatrix} c \\ r \\ 1 \end{bmatrix} = \mu KR \begin{bmatrix} 1 & 0 & 0 & -C_x \\ 0 & 1 & 0 & -C_y \\ 0 & 0 & 1 & -C_z \end{bmatrix} \begin{bmatrix} X \\ Y \\ Z \end{bmatrix}$$

Wherein:
c is a pixel column location of an image of an object (corresponding to x coordinate with reference to FIG. 1);
r is a pixel row location of the image of the object (corresponding to y coordinate with reference to FIG. 1);
$\mu$ is a scalar;
K is a camera calibration matrix, as detailed hereinbelow;

R is a rotation matrix between the reference coordinate system and the image coordinate system as defined with reference to FIG. 1;

$C=[C_x, C_y, C_z]$ are the coordinates of the camera in the reference coordinate system;

X, Y, Z are the coordinates of the object in the reference coordinate system.

R and C are also referred to as external parameters or external orientation of an image.

The camera calibration matrix may be expressed as follows:

$$K = \begin{bmatrix} f_c & s & c_0 \\ 0 & f_r & r_0 \\ 0 & 0 & 1 \end{bmatrix}$$

Wherein:

$f_c$ is a focal of the camera along the column axis;
$f_r$ is a focal of the camera along the row axis;
s is a skewness of the camera;
$c_0$ is a column coordinate of the focal center in the image coordinate system;
$r_0$ is row coordinate of the focal center in the image coordinate system.

K is also referred to as internal parameters or internal orientation of an image.

Referring now to FIG. 2A, a ground image 5 and a reference image 6 are input into a processing unit 7 which outputs a georeferenced ground image to an output device 8. The ground image 5 and the reference image 6 both image a common scene from two different locations with two different lines of sight.

In some embodiments, the ground image 5 may be a panorama obtained from a plurality of overlapping images acquired consecutively by a ground camera. Manual and/or automatic alternatives may be provided by the ground camera to capture overlapping images. Subsequent images within the plurality of overlapping images may have slightly different external parameters. When a plurality of overlapping images is acquired, the panorama may be obtained by a panorama stitching method. Creation of the panorama may include running a SIFT algorithm on each couple of consecutive images to find one or more tie points between the two consecutive images. Description of SIFT techniques can be found for example in U.S. Pat. No. 6,711,293 and in publication "*Distinctive Image Features from Scale-Invariant Keypoints*, David G. Lowe, *ICCV*, 2004".

For a tie point, the camera model can provide a homographic equation that can be expressed as follows:

$$\begin{bmatrix} c_1 \\ r_1 \\ 1 \end{bmatrix} = \alpha K R_0 R_1 (K R_0 R_2)^{-1} \begin{bmatrix} c_2 \\ r_2 \\ 1 \end{bmatrix}$$

Wherein:

$R_0$ is a rotation matrix between the center of the panorama and the reference coordinate system;

$R_1$ is a rotation matrix between the panorama center and the first image of the couple of consecutive images;

$R_2$ is a rotation matrix between the panorama center and the second image of the couple of consecutive images;

Therefore, after identifying one or more tie points, a least square process may be run to improve accuracy on K, $R_1$, $R_2$, between images. Advantageously, it is also possible to run similar process for every couple of overlapping images and not solely on consecutive images so as to enhance accuracy of K and $R_i$ (i integer variable comprised from 1 equal to the number of images in the panorama). Carrying the aforementioned method of panorama creation enables to obtain a "floating panorama" i.e. a panorama with highly accurate internal connections between all images since the K and $R_i$ can be assessed with high accuracy while the actual connection to the world cannot be determined (i.e. the $R_0$ and C are not solved). One further advantage of panorama creation results from the extended field of view which enables to operate the further steps of pivot areas selection with more chances of success.

The processing unit 7 may be integral with said ground camera. Alternatively, the processing unit 7 may be distant of the ground camera and the ground camera may communicate with said processing unit 7. The reference image 6 may be an aerial or a satellite image acquired by a reference camera. In some embodiments, the reference image may also be a ground image acquired by the ground camera. More than one reference images may be provided to the processing unit 7 to serve in the georeferencing of the ground image 5. The reference image 6 may be stored in a memory storage of the processing unit 7 or may be communicated to the processing unit 7 by the reference camera. The output device 8 may be the ground camera or a subsequent processing unit, for example a target location unit enabling from two georeferenced images to accurately locate a target appearing in the two georeferenced images. Similarly, such subsequent processing unit may be located within the ground camera or may be distant and in communication therewith.

Figure 2B:
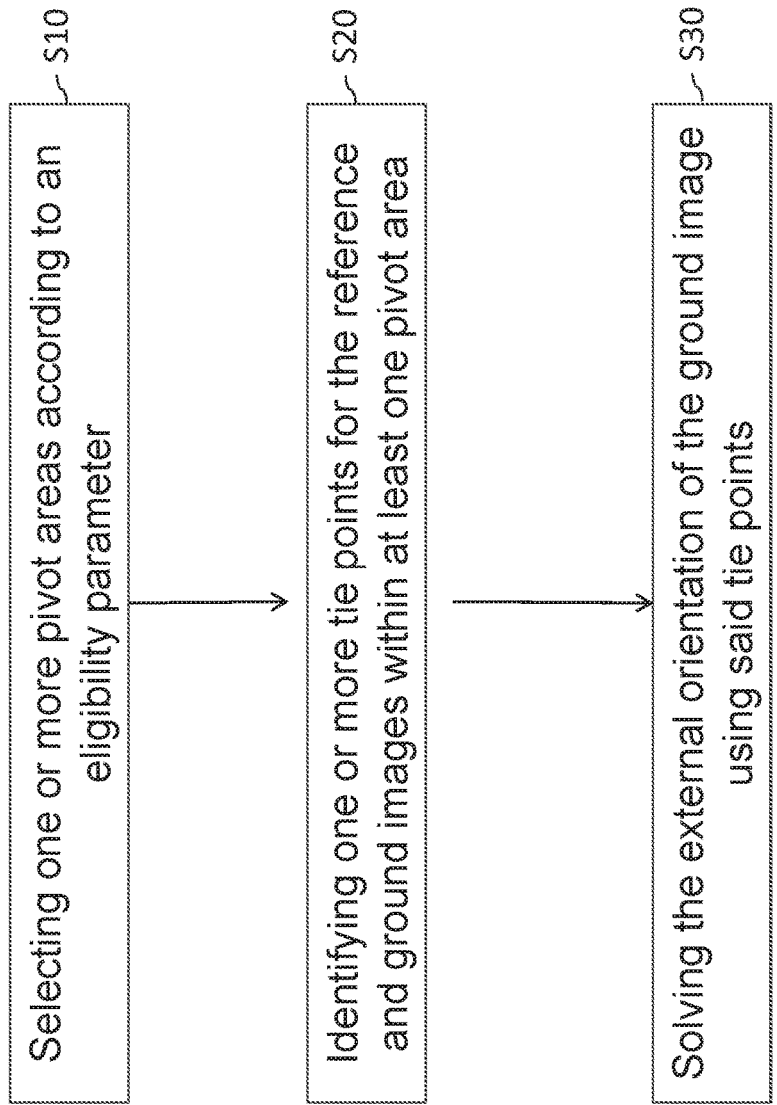
FIG. 2B is a flow chart illustrating schematically steps of the method which may be implemented on the system of FIG. 2A according to some embodiments of the present disclosure

FIG. 2B is a flow chart describing schematically a method of georeferencing which can be carried out by the processing unit 7 according to some embodiments of the present disclosure. In a first step S10 of analyzing and selecting, one or more pivot areas may be selected from the scene. The pivot areas may be chosen so as to provide suitable data for further image processing. Particularly, the inventor has found that identification of tie points between an aerial image and a ground image can be facilitated by selectively applying image matching processes on pivot areas. The pivot areas may be selected based on an eligibility parameter meeting a predefined criterion. The eligibility parameter may enable to assess a quality of a synthetic view that would result from synthesizing a given zone of the reference image with the external orientation of the ground image, wherein the given zone of the reference image corresponds to the area in the scene (i.e. the given zone is the conjugate of the area in the reference image and can be determined for example based on the camera model). In an embodiment, pivot areas may be determined based on an angular difference between the local line of sight of the pivot area in the ground image and the local line of sight of the pivot area in the reference image. For example, when a ground patch (surface) is being observed from two, relatively close viewpoints, the spatial angle seen by the two images is supposed to be relatively small. As the viewpoints begin to depart from each other the spatial angle increases. As explained hereinbelow, the determination of the eligibility parameter may be based on the Line-Of-Sight difference between the ground and the reference image. In a second step S20, tie points within the selected pivot areas may be identified for the ground and reference images. Identification of tie points may be performed by image matching processes. For example, a Scale-Invariant Feature Transform (SIFT) algorithm or an optimization algorithm may be used to recognize tie points from the reference and ground images. More details on step S20 are given with reference to FIG. 4. In a third step S30, the external orientation of the ground image may be solved (i.e. an accuracy of the external parameters may be improved) based on the identified tie points and on the ground camera model. More details on step S30 are given with reference to FIG. 5.

Figure 3A:
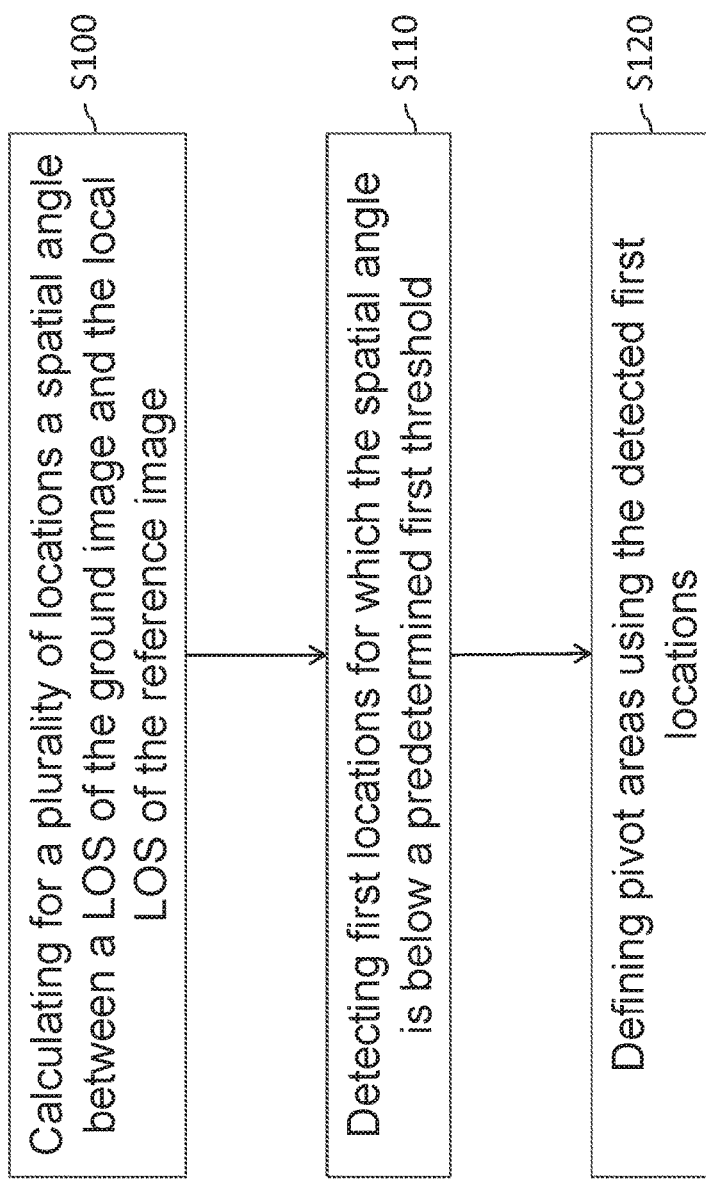
FIG. 3A is a flow chart illustrating schematically details of a step of selecting one or more pivot areas in some embodiments of the present disclosure.
Figure 3B:
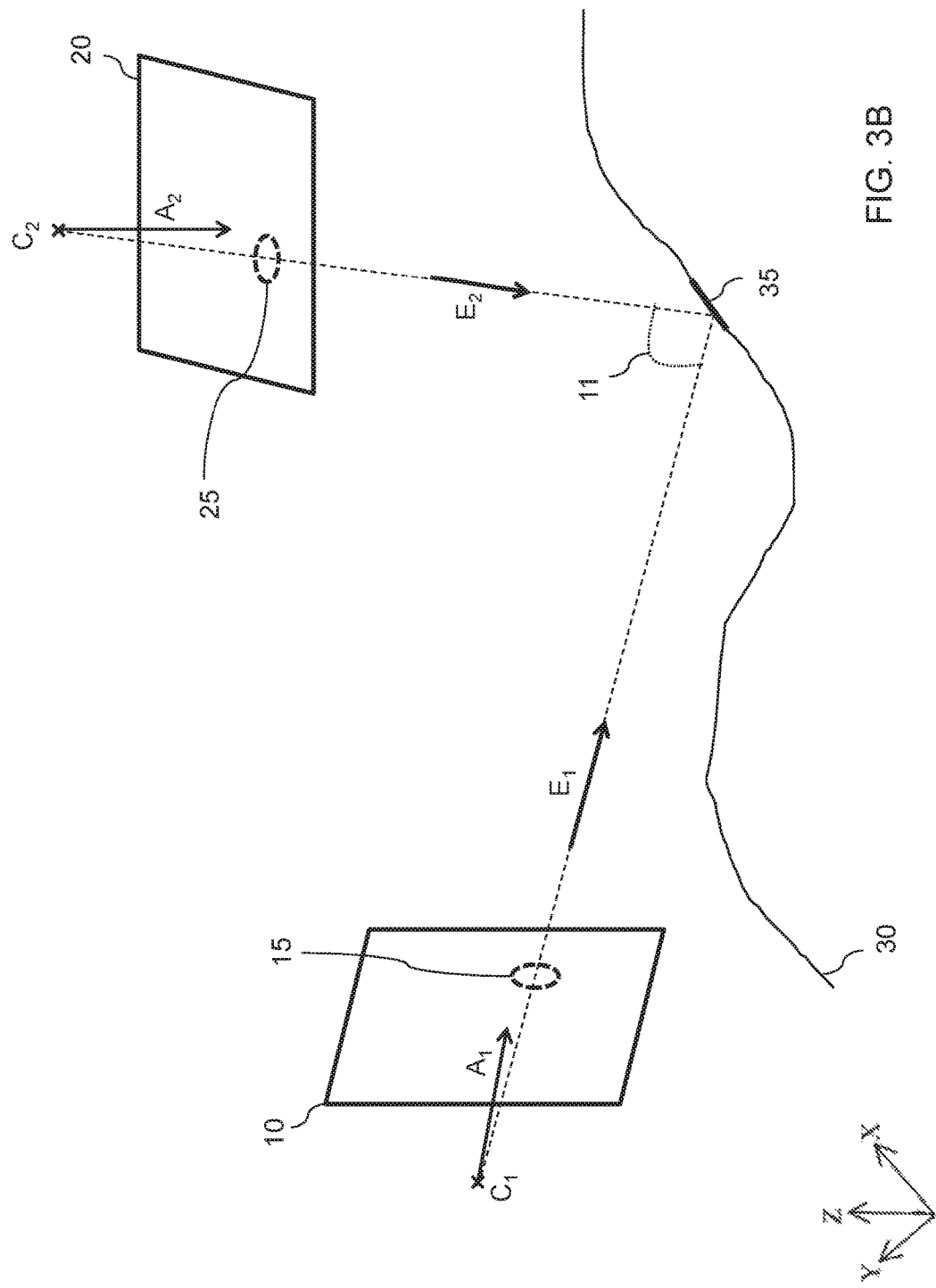
FIG. 3B illustrates schematically a ground image and a reference image as well as pivot area in some embodiments of the present disclosure.

FIG. 3A is a block diagram illustrating in more details the pivot area selection step S10 in some embodiments of the present disclosure. FIG. 3B represents a ground image 10 and a reference image 20 of a three-dimensional (3D) scene 30 and a pivot area 35 selected according to the embodiment illustrated in FIG. 3A. The ground and reference images are respectively characterized by external parameters $C_1$, $C_2$ (locations of ground and reference cameras in the reference coordinate system XYZ) and $A_1$, $A_2$ (central lines of sight of ground and reference camera in the reference coordinate system XYZ).

In a first step S100, a spatial angle 11 is computed between the local line of sight E1 in the ground image 10 and the local line of sight E2 in the reference image 20 of a plurality of locations in the 3D scene 30. A spatial angle may be defined as an angle between two lines of sight in space. For example, a given pixel in the ground image 10 may be chosen and a local line of sight E1 of said given pixel in the ground image 10 may be calculated from a roughly predetermined central line of sight A1 of the ground image 10. Then, the given pixel may be associated to a corresponding location in the scene 30, and said corresponding location may be associated with a corresponding pixel of the reference image 20 using the reference camera model. Thereafter, the line of sight E2 of said given corresponding pixel in the reference image 20 may be calculated based on the predetermined central line of sight A2 of the reference image 20. In a second step S110, first locations—among said plurality of locations—for which the spatial angle 11 is below a predetermined first threshold are detected. In a third step S120, one or more pivot areas are defined as continuous sets of first locations. In other words, pivot areas are surfaces of the 3D scene 30 defined as aggregation of first locations wherein the first locations are points in the scene 30 for which the spatial angle 11 between the local line of sight of the ground image and the local line of sight of the reference image is below the first threshold. Therefore, in certain embodiments, the eligibility parameter may be the spatial angle 11 and the predefined criterion may be the spatial angle below the predetermined first threshold.

In other words, in a first step S100, a spatial angle 11 between the line-of-sight rays at the point of interest is computed for a plurality of locations of the scene. In a second step S110 one or more locations for which the space angle is below a predefined threshold are detected. In a third step S120, a subset, with a predefined cardinality (i.e. number of locations), of the plurality of the locations detected in the previous step is selected. The selection is made in a way to maximize the area ratio between the convex hull defined by the selected subset and that defined by the entire set detected in step S110. The idea is to select a maximum area (image region) enclosed by a given set of points within the selected location. The selected area shall be convex, namely a line segment connecting any two points belonging to the area shall be fully contained in the area.

As illustrated on FIG. 3B, a pivot area 35 in the physical world corresponds to a ground pivot zone 15 on the ground image 10 and to a reference pivot zone on the reference image 20. The ground and reference pivot zones 15, 25 can be determined by using respectively the ground and reference camera models.

In some embodiments, a plurality of reference images is available and the above pivot areas detection is carried out for the plurality of reference images. A resulting pivot area is therefore associated to a given reference image. The following processing is performed in accordance with the reference image to which the pivot area is associated. In the event a location is determined as pivot area for more than one reference image, the reference image which provides the best fit between the ground angle and the reference angle may be selected.

Figure 4:
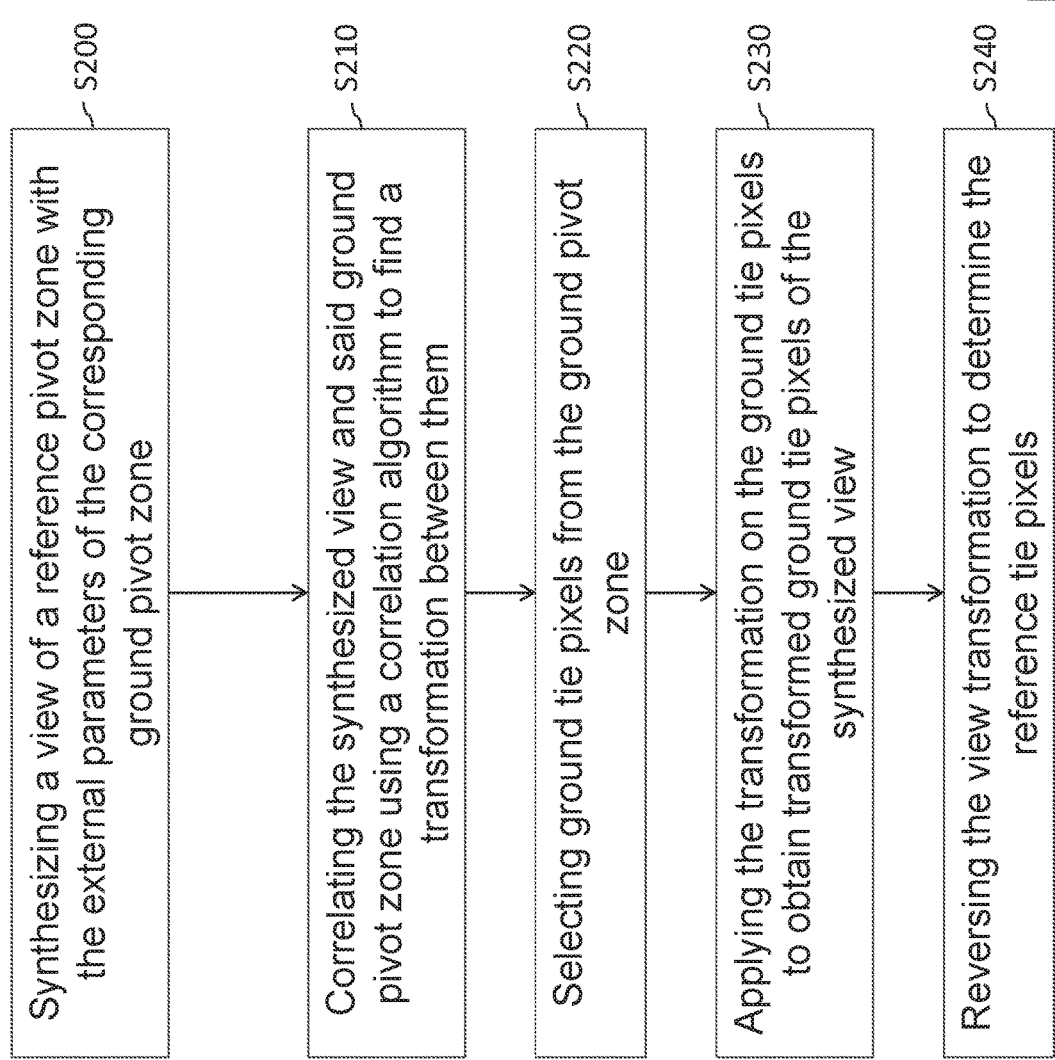
FIG. 4 is a flow chart illustrating schematically details of a step of identifying tie points in some embodiments of the present disclosure.

Referring now to FIG. 4, details are provided regarding the identification of tie points within the pivot areas carried out in step S20. An automatic process is contemplated in order to georeference the ground image. The automatic process is aimed at avoiding traditional techniques based on collecting manually control points and/or tie points. The process is hereinbelow described relatively to a given pivot area associated to a given reference image.

In a first step S200, a view of the reference pivot zone 25 is synthesized with the external parameters (line of sight and camera location) of the ground pivot zone corresponding to the same pivot area. View synthesizing algorithms may include a transformation to create a synthesized view of the reference pivot zone from a different location and line of sight. Examples of view synthesizing algorithms are for example described in the US patent application US2001/0038718. View synthesizing may be understood as a process of generating a view or partial image from a reference image and a digital elevation model by means of pixel substitution and interpolation.

Typically, view synthesizing algorithms do not provide satisfying results when used to synthesize a ground view from an aerial image. However, the pivot area selection process previously described enables to cope with the traditional limitations of such algorithms. In a second step S210, the synthesized view and the ground pivot zone may be correlated using an image matching algorithm to find a transformation capable of passing from the ground pivot zone to the synthesized view. Such transformation can be represented as a list of translations associated to the pixels of the ground pivot zone. The translations when applied to the pixels of the ground pivot zone enable to obtain the synthesized view.

In a third step S220, ground tie pixels may be randomly chosen in the ground pivot zone to be used as tie points. In a fourth step S230, the transformation may be applied to the ground tie pixels to find corresponding points in the synthesized view. In a fifth step S240, a reversed view may be used to find reference tie pixels in the reference pivot zone of the reference image corresponding to the ground tie pixels of the ground pivot zone of the ground image.

Figure 5:
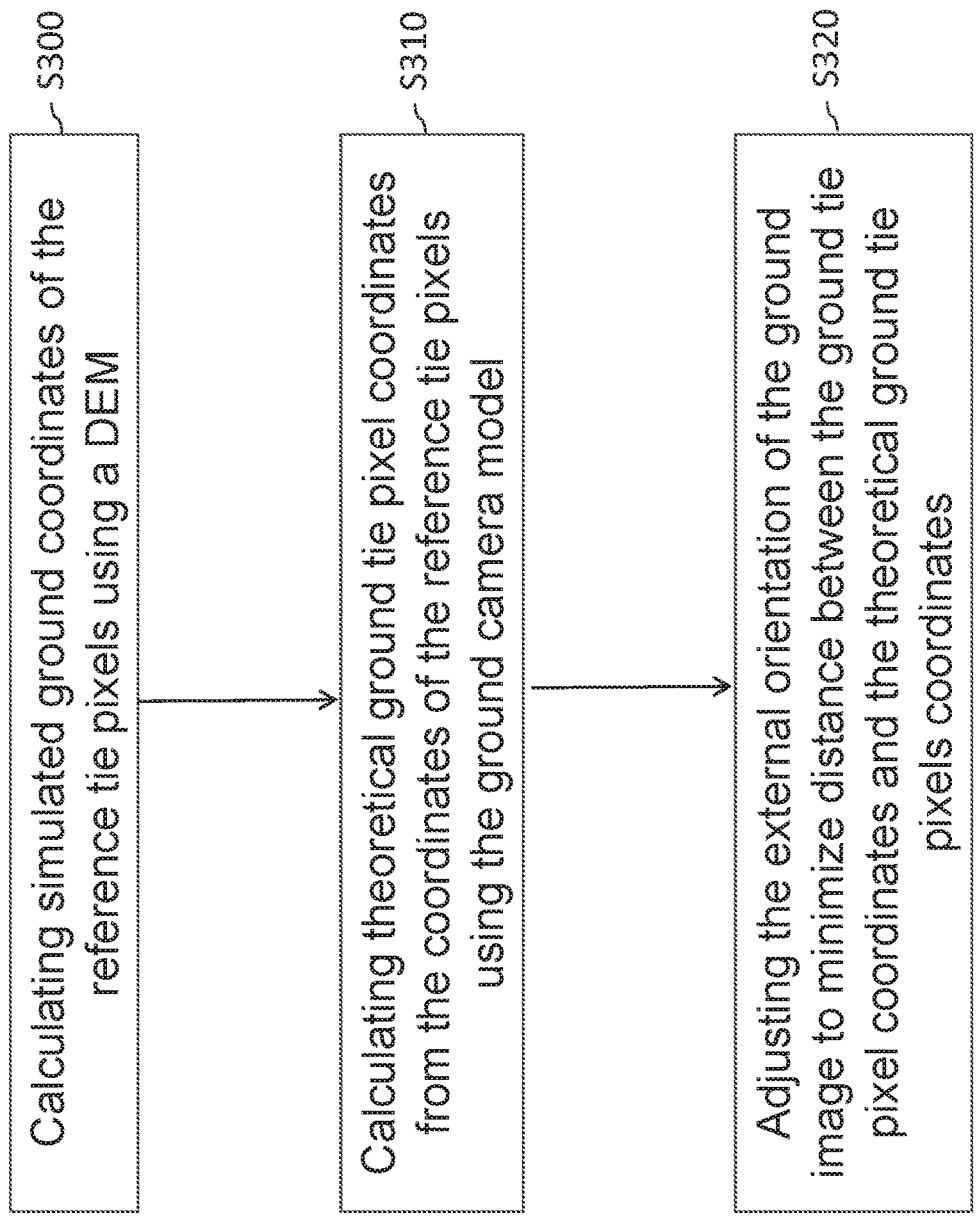
FIG. 5 is a flow chart illustrating schematically details of a step of solving an external orientation of a ground image in some embodiments of the present disclosure.

FIG. 5 refers to details of the step S30 illustrated in FIG. 2B in some embodiments of the present disclosure. In a first step S300, for at least some of the reference tie pixels, simulated ground coordinates corresponding to (conjugated of) the reference tie pixel coordinates in the scene may be determined using the digital elevation model of the scene and the local line of sight pointing at said reference tie pixel. Alternatively, when several reference images are available, simulated ground coordinates of the tie points may be calculated by ray intersection. In a second step S310, simulated ground pixel coordinates corresponding to the simulated ground coordinates may be calculated using the ground camera model. In a third step S320, the external parameters of the ground image may be iteratively modified to minimize errors between the simulated ground pixel coordinates and the ground tie pixel coordinates (known from step S220) over at least some of the tie pixels thereby leading to improvement in the accuracy of the characterization of the external parameters of the ground image.

Improvement on the accuracy of the external parameters of the ground image may be achieved by further additional and/or alternative steps. For example, if several reference images are available, then, it is also possible to carry out a step of using an image matching algorithm (for example SIFT) between the two or more reference images to find correlation between the two or more reference images and determine accurate tie points between the reference images. Thereafter, a step of calculating ground coordinates of said accurate tie points using ray intersection can be carried out (these points are thereby "control points"). Then, it is possible to perform transformation of the accurate tie (control) points into the ground image by using view synthesizing and transformation determination using image matching process (similarly to the previously described process). Eventually, using a least square process enables to (re) calculate the external parameters of the ground image as previously described.

Figure 6:
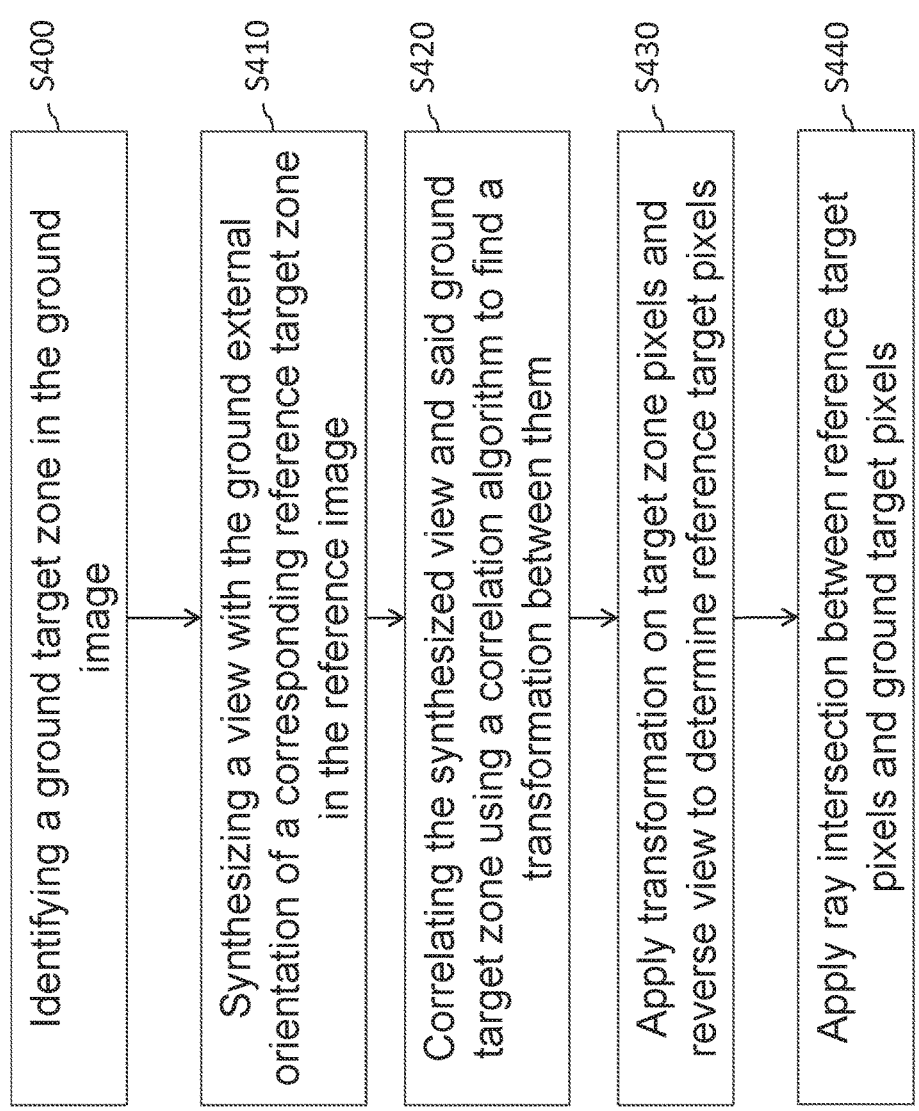
FIG. 6 is a flow chart illustrating schematically steps of a method of geo-location of a target according to some embodiments of the present disclosure.

FIG. 6 illustrates steps of a method of geo-location of a target according to embodiments of the present disclosure. Indeed, georeferencing of the ground image may enable accurate geo-location of a target appearing in both the ground and reference images. Alternative (iv) as defined in the definition section is described in more details hereinbelow with reference to FIG. 6. In a first step S400, the target may be identified in the ground image to define a ground target zone within the ground image. Then, a target scene area corresponding to (conjugated of) the target zone in the ground image may be determined in the ground coordinate system of the scene using an (approximate) DEM and the ground camera model. A reference target zone in the reference image corresponding to (conjugated of) the target scene area may be determined using the reference camera model. In a second step S410, a synthetic view of the reference target zone with the external orientation of the ground image may be synthesized. In a third step S420, a correlation between the synthesized view and the ground target zone may be performed to find a transformation between the ground target zone and the synthesized view. In a fourth step S430, target pixel coordinates of the ground target zone may be transposed into the reference image using the transformation and the reversed view. In a fifth step S440, ray intersection from the ground target pixels and reference target pixels is performed to obtain the coordinates of the target. Advantageously, since an area around the target may be processed the target of interest may not even be present on the reference image to be accurately localized.

In some embodiments, when the target is not on the georeferenced panorama (georeferenced ground image), the geo-location method may further comprise the following steps: capturing a new image in which the target to geolocate appears; using an image matching algorithm such as SIFT between the new image and the ground image to find tie points; finding the relevant area of the panorama in which the new image is located by detecting the area of the panorama in which most tie points are found; using an image matching algorithm between the relevant area of the panorama and the new image and using a least square process to calculate the line of sight and/or position of the new image. This embodiment is mainly similar to the embodiments previously described. However, instead of picking a pixel in the georeferenced panorama picking a pixel in a new image is performed and thereafter determination of the LOS of said image is performed using the georeferenced panorama. This case may be relevant when a new target to be geo-located does not appear in the georeferenced panorama.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method of georeferencing a first image of a scene acquired from a first imaging device based on at least one second image of the scene acquired from a second imaging device, the method comprising:
   obtaining data indicative of an eligibility parameter for one or more areas of the scene;
   selecting one or more pivot areas among the one or more areas of the scene, wherein the eligibility parameter of the pivot areas satisfy a predefined criterion;
   for at least some of the selected pivot areas, identifying tie points for the first and second images; and
   solving the external orientation of the first image using the identified tie points and a first imaging device model.

2. The method according to claim 1, wherein obtaining data indicative of an eligibility parameter of a given area is performed using an external orientation of the first image and an external orientation of the second image at the given area.

3. The method according to claim 2, wherein the eligibility parameter associated to a given area enables to assess a quality of a synthetic view that would result from synthesizing a zone of the second image with the external orientation of the first image wherein the zone of the second image corresponds to the given area of the scene.

4. The method according to claim 1, wherein an external orientation of the first image is approximately predetermined and an external orientation of the second image is accurately predetermined.

5. The method according to claim 1, wherein the eligibility parameter for a given area of the scene is defined as an angle between the local line of sight of the second image and the local line of sight of the first image at said given area.

6. The method according to claim 5, wherein the eligibility parameter satisfies the predefined criteria when the angle is below a predetermined threshold.

7. The method according to claim 1, wherein each pivot area of the scene correspond to a first pivot zone in the first image and to a second pivot zone in the second image and wherein identifying tie points comprises detecting first and second tie pixels by image matching process between the first and second pivot zones.

8. The method according to claim 1, wherein detecting first and second tie pixels comprises determining a transformation between the first and second pivot zones and applying said transformation to a set of pixels of the first pivot zone.

9. The method according to claim 8, wherein determining a transformation between the first and second pivot zones comprises determining a view transformation for synthesizing a view of the second pivot zone with the approximate external orientation of the first image and a residual transformation for passing from the synthesized view to the first pivot zone.

10. The method according to claim 1, wherein one or more subsequent second images of the scene with predetermined accurate external orientations are provided and wherein the solving the external orientation comprises calculating coordinates of the tie points in a ground referential by ray tracing using the one or more subsequent second images.

11. The method according to claim 1, wherein one or more subsequent second images of the scene with predetermined accurate external orientations are provided and wherein the selecting one or more pivot area is performed with said subsequent second images and each pivot area is associated with a second image.

12. The method according to claim 1, further comprising solving an internal orientation of the first image.

13. The method according to claim 1, further comprising capturing a plurality of overlapping images using the first imaging device and creating a panorama thereby providing the first image.

14. The method according to claim 13, further comprising relative referencing of the plurality of overlapping images.

15. The method according to claim 1, wherein the second imaging device and the first imaging device are identical.

16. A method of geo-locating a target in a scene using a first image of the scene acquired from a first imaging device and at least one second image of the scene acquired from a second imaging device, the method comprising:
   georeferencing the first image according to the method of claim 1;
   identifying target pixel coordinates in the first image and in the second image;
   determining the target ground coordinates using ray intersection.

17. The method according claim 16, wherein identifying the target pixel coordinates in the second image comprises:
   identifying a first target zone in the first image;
   determining a corresponding second target zone in the second image;
   determining a transformation between the first and second target zones; and
   applying said transformation to the target pixels in the first image.

18. A data processing apparatus comprising means for carrying out the method according to claim 1.

19. A data processing apparatus for georeferencing a first image of a scene acquired from a first imaging device based on at least one second image of the scene acquired from a second imaging device, the data processing apparatus comprising:
   an analysis and selection unit configured for:
   obtaining data indicative of an eligibility parameter for one or more areas of the scene; and
   selecting one or more pivot areas among the one or more areas of the scene, wherein the eligibility parameter of the pivot areas satisfy a predefined criteria;
   an identification unit configured for identifying, for at least some of the pivot areas, tie points between the first and second images;
   a calculation unit configured for solving the external orientation of the first image based on the identified tie points and on a first imaging device model.

20. An imaging device including the data processing apparatus according to claim 19.

* * * * *